United States Patent [19]
Kogawa et al.

[11] 4,356,470
[45] Oct. 26, 1982

[54] MULTIFUNCTION ELECTRONIC METER FOR VEHICLE

[75] Inventors: Kouichi Kogawa; Teruo Kawasaki, both of Yokohama; Hiroyuki Nomura, Fujisawa; Hiroshi Yano, Higashiyamato, all of Japan

[73] Assignee: Nissan Motor Co., Ltd., Yokohama, Japan

[21] Appl. No.: 188,108

[22] Filed: Sep. 17, 1980

[30] Foreign Application Priority Data

Sep. 25, 1979 [JP] Japan .................... 54-121970

[51] Int. Cl.³ .................................. G08B 19/00
[52] U.S. Cl. .......................... 340/52 F; 340/517; 340/521
[58] Field of Search .......... 340/52 F, 517, 519, 340/521, 524, 525

[56] References Cited
U.S. PATENT DOCUMENTS

| | | |
|---|---|---|
| 3,964,018 | 6/1976 | Strait et al. .................. 340/52 F |
| 4,140,996 | 2/1979 | Leitch et al. ................ 340/52 F |
| 4,287,503 | 9/1981 | Sumida . |
| 4,287,504 | 9/1981 | Simon et al. . |
| 4,307,374 | 12/1981 | Bode et al. . |

FOREIGN PATENT DOCUMENTS

| | | |
|---|---|---|
| 1334184 | 10/1971 | United Kingdom . |
| 1385007 | 8/1973 | United Kingdom . |
| 1458437 | 4/1974 | United Kingdom . |
| 1484687 | 12/1974 | United Kingdom . |
| 1515954 | 5/1976 | United Kingdom . |
| 2002703 | 8/1978 | United Kingdom . |

*Primary Examiner*—Alvin H. Waring
*Attorney, Agent, or Firm*—Lane, Aitken, Kice & Kananen

[57] ABSTRACT

A multifunction electronic meter for a vehicle can display selectively plural measured informations of fuel amount, cooling water temperature, oil pressure, battery voltage and the like of a vehicle on a single display section, the displayed informations being accompanied respectively with combinations of symbolmarks and surrounding frames thereof for identifying and warning those informations.

The principal information of, for instance, fuel amount is ordinarily displayed, while the remaining informations are displayed selectively as occasion demands, for instance, in response to the occurrence of an emergency. When plural emergencies are simultaneously caused, the information corresponding to the lastly caused emergency is displayed intermittently together with the symbolmark, while only the symbolmarks and the frames of the informations corresponding to the previously caused emergencies are displayed continuously. Consequently, the most requisite measured information can be ordinarily noticed by a driver, as well as the remaining informations which are noticeable as occasion demands, regardless of the desired simplicity of configuration of an instrument panel of the vehicle.

4 Claims, 5 Drawing Figures

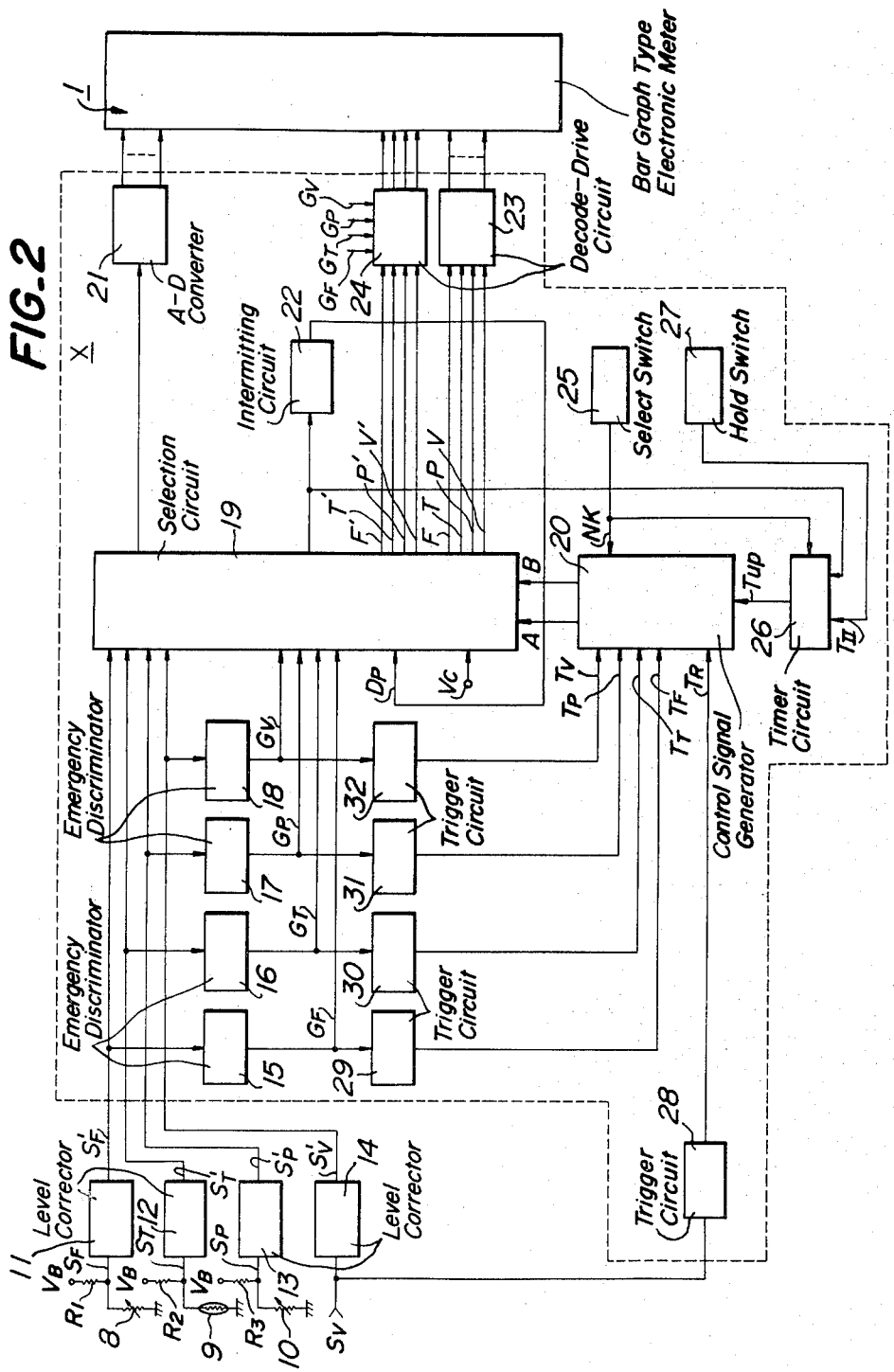

MULTIFUNCTION ELECTRONIC METER FOR VEHICLE

BACKGROUND OF THE INVENTION (1) Field of the Invention

The present invention relates to a multifunction electronic meter for a vehicle which is able to display a number of measured informations using one display section.

(2) Description of the Prior Art

An electronic meter for vehicle use able to display by an indicator formed as a phosphorescent indicator, a liquid crystal indicator, or the like, the various measured informations such as the amount of the fuel, the temperature of the cooling water, the oil pressure, the battery voltage, the engine speed, etc. has been disclosed and used in practice recently.

Among those various measured informations, for instance, the amount of the fuel is required to be able to be always confirmed by the driver, whilst the temperature of the cooling water, the oil pressure and the battery voltage are not necessarily able to be always confirmed by the driver, so that the values and the necessities of those measured informations are different from one another.

Accordingly, it is not only unnecessary to provide plural electronic meters respectively for those various measured informations so as to always display those measured informations, but it causes such a defect that the configuration of the instrument panel is complicated.

SUMMARY OF THE INVENTION

The present invention is devised by referring to the above.

An object of the present invention is to provide a multifunction electronic meter for a vehicle which is improved for making it possible to display various kinds of measured informations on a single display section thereof, and further to display ordinarily the most requisite information, for instance, the amount of the fuel and to display selectively the other informations as occasion demands.

The feature of the multifunction electronic meter for vehicle according to the present invention is to comprise an electronic indicator arranged to display plural measured informations and plural symbolmarks provided for identifying those informations and warning thereof on a single display section, and a display control circuit arranged to control the above electronic indicator in such a manner that, among those plural measured informations, the principal information, for instance, the amount of the fuel, is ordinarily displayed together with the symbolmark thereof on the display section of the above electronic indicator, and, when any other information, for instance, either one of the temperature of the cooling water, the oil pressure, the battery voltage and the like is selected, the selected information is displayed together with the symbolmark thereof on the same.

The present invention will be explained in detail hereinafter by referring to the accompanied drawings.

BRIEF DESCRIPTION OF THE DRAWINGS

FIG. 2 is a block diagram showing an embodiment of the multifunction electronic meter for vehicle use according to the present invention;

DESCRIPTION OF THE PREFERRED EMBODIMENTS

Figure 1:
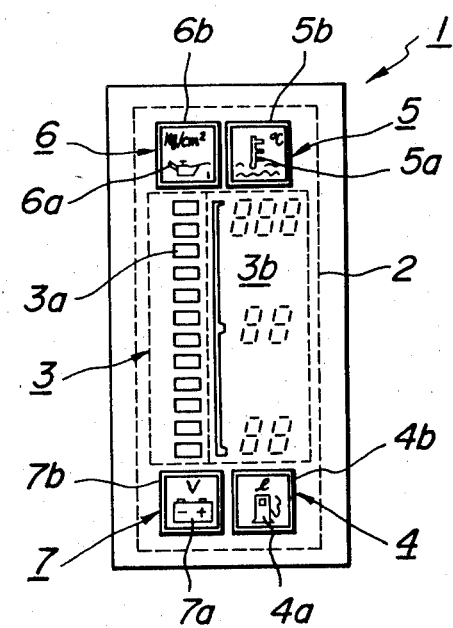
FIG. 1 is an outside view showing an appearance of an electronic indicator forming the multifunction electronic meter for a vehicle according to the present invention.

Firstly, an example of an electronic indicator forming the multifunction electronic meter for vehicle use according to the present invention will be explained by referring to FIG. 1. FIG. 1 shows an appearance of an electronic indicator 1 of bar graph type, which is formed of, for instance, a phosphorescent indicating tube. A display section 2 of the electronic indicator 1 comprises, as shown in FIG. 1, an information display section 3 serving as a fuel meter, a water temperature meter, an oil pressure meter and a battery voltage meter, and further symbolmark display sections displaying symbolmarks provided for identifying the informations displayed on the information display section 3 and warning thereof, that is, a fuel meter symbolmark display section 4, which is shortened by "FM", a water temperature meter symbolmark display section 5, which is shortened by "TM", an oil pressure meter symbolmark display section 6, which is shortened by "PM" and a battery voltage meter symbolmark display section 7, which is shortened by "VM".

The information display section 3 comprises a bar graph section 3a formed of twelve displaying segments and a scale section 3b. The symbolmark display sections, namely, FM4, TM5, PM6 and VM7 are formed respectively of symbolmarks 4a, 5a, 6a and 7a and frames 4b, 5b, 6b and 7b which surround those symbolmarks 4a, 5a, 6a and 7a respectively. Further, the bar graph section 3a, the scale section 3b and the symbolmarks 4a, 5a, 6a and 7a are arranged to radiate green fluorescent lights, whilst the frames 4b, 5b, 6b and 7b are arranged to radiate red fluorescent lights.

The displaying operation of the electronic indicator 1 formed as mentioned above is controlled by a display control circuit as mentioned later, so as to display selectively informations relating to the fuel amount, the water temperature, the oil pressure and the battery voltage on the information display section 3 and to display the symbolmarks 4a, 5a, 6a and 7a corresponding respectively to those displayed informations on the symbolmark display sections, namely, FM4, TM5, PM6 and VM7 respectively.

Nextly, an embodiment of the multifunction electronic meter according to the present invention will be explained by referring to FIG. 2. In FIG. 2, numeral 8 refers to a fuel amount sensor of conventional float type, in which a resistance of a variable resistor is varied in response to the amount of the fuel and is converted to a voltage signal $S_F$ by a constant voltage $V_B$ imposed thereon through a resistor $R_1$. The numeral 9 denotes water temperature sensor provided for detecting the temperature of the cooling water of the engine, in which sensor a voltage signal $S_T$ is generated by the constant voltage $V_B$ imposed thereon through a resistor $R_2$ in response to the temperature of the cooling water. The reference numeral 10 refers to an oil pressure sensor of conventional sliding resistor type, in which a diaphragm is operated by the oil pressure and, as a result thereof, a slider which contacts with a resistive wire is shifted, so as to vary a resistance thereof, which resistance is converted a voltage signal $S_P$ through a resistor $R_3$ in response to the oil pressure by the constant voltage $V_B$. Another voltage signal $S_V$ is delivered from the battery not shown in FIG. 2 as a signal indicating a voltage corresponding to the battery voltage, when an ignition switch not shown in FIG. 2 is closed. The numerals 11 to 14 are level correctors in which the voltage signals $S_F$, $S_T$, $S_P$ and $S_V$ derived respectively from those sensors 8 to 10 and the battery are received and converted respectively to output voltage signals $S'_F$, $S'_T$, $S'_P$ and $S'_V$, levels of which are corrected so that the highest levels thereof correspond respectively to the full scale of the bar graph section 3a in the information display section. Those level correctors 11 to 14 can be formed, for instance, of plural amplifiers, the amplification factors of which are different from each other.

Nextly, a display control circuit X which is surrounded by a broken line in FIG. 2 will be explained. The elements 15 to 18 are emergency discriminators in which the above output voltage signals $S'_F$, $S'_T$, $S'_P$ and $S'_V$ derived respectively from those level correctors 11 to 14 are received so as to discriminate the respective emergencies by referring to signal levels thereof. In other words, in the emergency discriminator 15, when the signal level of the output voltage signal $S'_F$ is lower than a predetermined level, the insufficiency of the fuel is discriminated thereby, so as to generate an emergency signal $G_F$. In the emergency discriminator 16, when the signal level of the output voltage signal $S'_T$ is lower than another predetermined level, the too high temperature of the cooling water is discriminated, so as to generate an emergency signal $G_T$. In the emergency discriminator 17, the signal level of the output voltage signal $S'_P$ is lower than still another predetermined level, the too low pressure of the oil is discriminated, so as to generate an emergency signal $G_P$. Further, in the emergency discriminator 18, when the signal level of the output voltage signal $S'_V$ is lower than further another predetermined level, the too low voltage of the battery is discriminated, so as to generate an emergency signal $G_V$.

The numeral 19 refers to a selection circuit formed, for instance, of a multi-input multiplexer or the like, in which the output voltage signals $S'_F$, $S'_T$, $S'_P$ and $S'_V$ derived respectively from the level correctors 11 to 14 are selected in response to output signals A and B derived from a control signal generator 20, so as to supply the above selected output voltage signal to an A-D converter 21, whilst the emergency signals $G_F$, $G_T$, $G_P$ and $G_V$ derived respectively from the emergency discriminators 15 to 18 are supplied selectively to an intermitting circuit 22 in response to the output signals A and B derived from the control signal generator 20.

Moreover, in the selection circuit 19, a voltage signal $V_C$ is distributed to signal lines F, T, P and V in response to the output signals A and B, and an intermitting signal $D_P$ derived from the intermitting circuit 22 is also distributed to signal lines F', T', P' and V' in response to the output signals A and B, those distributed signals $V_C$ and $D_P$ being supplied respectively to decode-drive circuits 23 and 24.

The relation between the above mentioned operations of selection and distribution and the output signals A and B is arranged, for instance, as shown in the following table.

| Selection | A | B | Distribution | |
|---|---|---|---|---|
| $G_F$   $S'_F$ | 0 | 0 | $V_C \rightarrow F$ | $D_P \rightarrow F'$ |
| $G_T$   $S'_T$ | 1 | 0 | $V_C \rightarrow T$ | $D_P \rightarrow T'$ |
| $G_P$   $S'_P$ | 0 | 1 | $V_C \rightarrow P$ | $D_P \rightarrow P'$ |
| $G_V$   $S'_V$ | 1 | 1 | $V_C \rightarrow V$ | $D_P \rightarrow V'$ |

The circuit configuration of the control signal generator 20 is arranged such as both of the output signals A and B are ordinarily set to "0", and, as a result thereof, in the selection circuit 19, the output voltage $S'_F$, that is, the fuel amount information is ordinarily selected to be supplied to the A-D converter 21, as well as the voltage signal $V_C$ is ordinarily distributed to the signal line F to be supplied to the decode-drive circuit 23.

On the other hand, the circuit configuration to the control signal generator 20 is arranged so that, every time a select switch 25 is operated, the output signals A and B are converted from "0" and "0" to "1" and "0", "0" and "1", "1" and "1" in order respectively, so that the output voltage signal $S'_T$, namely, the water temperature information, the output voltage signal $S'_P$, namely, the oil pressure information, and the output voltage signal $S'_V$, namely, the battery voltage information, are selected according to the number of operations of the select switch 25, so as to be supplied to the A-D converter 21, as well as the voltage signal $V_C$ is distributed to the signal lines T, P and V, so as to be supplied to the decode-drive circuit 23.

The A-D converter 21 is formed of such conventional circuits as a number of, for instance, twelve comparators or the likes, which drive such a number of display segments forming the bar graph section 3a shown in FIG. 1 as in response to signal levels of those output voltage signals $S'_F$, $S'_T$, $S'_P$ and $S'_V$ respectively, to be luminous for the display, whilst the circuit configuration of the decode-drive circuit 23 is arranged to control the lighting of the scale of the scale section 3b of the electronic indicator 1 as shown in FIG. 1 and the selective lighting of the numeral value of the scale section 3b and the symbolmarks 4a, 5a, 6a and 7a of the symbolmark display sections, that is, FM4, TM5, PM6 and VM7 according to which signal line is selected for supplying the voltage signal $V_C$ thereto.

In other words, when the voltage signal $V_C$ is supplied thereto through the signal line F, the numerals "0", "25", "50" on the unit of "l" for displaying the fuel amount information and the symbolmark 4a are lighted, and when it is supplied through the signal line T, the numerals "50", "90", "130" on the unit of "°C." for displaying the water temperature information and the symbolmark 5a are lighted, and when it is supplied through the signal line P, the numerals "0", "3", "6" on the unit of "kg/cm²" for displaying the oil pressure information and the symbolmark 6a are lighted, and further when it is supplied through the signal line V, the numerals "6", "12", "18" on the unit of "V" for displaying the battery voltage information and the symbolmark 7a are lighted.

Furthermore, it is possible also that the units of numerals for displaying the fuel amount information, the water temperature information and the like are indicated on the scale section 3b together with those numerals.

Accordingly, when the select switch 25 is not operated, the fuel amount information is displayed ordinarily on the display section 2 of the electronic indicator 1 together with the symbolmark 4a thereof, whilst, when the select switch 25 is operated, either one of the water temperature information, the oil pressure information and the battery voltage information is displayed together with a respective one of the symbolmarks 5a, 6a and 7a according to the number of operations thereof. The above is based on the fact that the fuel amount information is the most requisite to be displayed ordinarily, namely, when the select switch 25 is not operated.

In the case that either one of the informations of the water temperature, the oil pressure and the battery voltage is selected by operating the select switch 25, the operation signal NK generated by the select switch 25 is supplied to a timer circuit 26 also, so as to start it. The timer circuit 26 is timed up, for instance, about eight seconds after the starting thereof, so as to supply a time up signal $T_{up}$ to the control signal generator 20. In the control signal generator 20, the output signals A and B thereof are set to "0" and "0" respectively by the time up signal $T_{up}$, so that the output voltage signal $S'_F$ is supplied to the A-D converter 21 through the selection circuit 19, as well as the voltage signal $V_C$ is distributed to the signal line F. As a result thereof, the fuel amount information is displayed on the display section 2 of the electronic indicator 1. Furthermore, a self reversion circuit is formed by the timer circuit 26 and the control signal generator 20.

On the other hand, a hold switch 27 is provided for annulling the effect of the above self reversion circuit, so as to hold the displayed information which is selected by the select switch 25 as it is displayed, and an operation signal $T_Z$ generated by operating the hold switch 27 is supplied to the timer circuit 26, so as to inhibit the timer operation thereof. As a result, the time up signal $T_{up}$ is not supplied to the control signal generator 20, so that the output signals A and B of the control signal generator 20 are held in the state settled by the select switch 25, so as to maintain the information displayed at that time as it is.

According to the above mentioned operation, the desired information can be displayed on the electronic indicator 1 at such a timing as occasion demands. Moreover, it is possible to change the information to be displayed by operating the select switch 25, whenever the change is required.

However, it is feared in accordance with the provision of the above mentioned hold switch 27 that the information which is not required so much to be ordinarily displayed, that is, either one of informations relating to the water temperature, the oil pressure or the battery voltage is maintained as it is displayed.

Accordingly, it is preferable that, when the voltage signal $S_V$ is applied to the level corrector 14 by closing the ignition switch not shown in FIG. 2, a trigger circuit 28 is started by the voltage signal $S_V$, and, as a result thereof, the output signals A and B of the control signal generator 20 are set to "0" and "0" respectively by a trigger signal $T_R$ derived therefrom. So that it is possible according to the provision of such an initially resetting circuit as mentioned above that the information displayed on the electronic indicator 1 is ordinarily reversed without fail into that of the fuel amount.

When either one of the emergency signals $G_F$, $G_T$, $G_P$ and $G_V$ is derived from a corresponding one of the emergency discriminators 15 to 18 in response to the emergency discriminated thereby as mentioned earlier, either one of the trigger signals $T_F$, $T_T$, $T_P$ and $T_V$ is supplied to the control signal generator 20 by a corresponding one of the trigger circuits 29, 30, 31 and 32.

The output signals A and B of the control signal generator 20, which is operated as a switching circuit, are set to "0, 0", "1, 0", "0, 1", or "1, 1" respectively according to the trigger signals $T_F$, $T_T$, $T_P$ or $T_V$ supplied thereto, so that, in the case of the occurrence of an emergency, it is possible to display the information in which the emergency has been caused on the display section 2 of the electronic indicator 1, no matter which information is displayed thereon at that time.

Furthermore, in this case, either one of the emergency signals $G_F$, $G_T$, $G_P$ and $G_V$ is supplied to the intermitting circuit 22 through the selection circuit 19, and, as a result thereof, the intermitting circuit 22 formed of an oscillator is started, so as to generate an intermitting signal $D_P$. The intermitting signal $D_P$ is supplied to the decode-drive circuit 24 through the selection circuit 19, which circuit 24 is already supplied with the emergency signals $G_F$, $G_T$, $G_P$ or $G_V$ respectively through the signal lines F', T', P' or V' to which lines those emergency signals are distributed respectively by the selection circuit 19.

The decode-drive circuit is formed as a lighting and intermitting control circuit provided for lighting continuously or intermittently the frames 4b, 5b, 6b and 7b of the symbolmark display sections, that is, FM4, TM5, PM6 and VM7 in the electronic indicator 1 as shown in FIG. 1 in response to the intermitting signal $D_P$ and the emergency signals $G_F$, $G_T$, $G_P$ and $G_V$ supplied thereto, so as to light the frame of the symbolmark display section in red intermittently, on which section the symbolmark relating to the information, which corresponds to the caused emergency and is displayed on the display section 2, is displayed.

Moreover, when the emergency is caused, either one of the emergency signals $G_F$, $G_T$, $T_P$ and $G_V$ is supplied to the timer circuit 26, so as to inhibit the timer operation thereof, so that the information which is displayed in response to the caused emergency is held as it is displayed.

For instance, in the case that, during the occurrence of the emergency of poor fuel amount, another emergency of too low battery voltage is caused simultaneously, the output signals A and B of the control signal generator 20 are set to "1, 1" by the trigger signal $T_V$ derived from the trigger generator 32, so that the battery voltage information and the symbolmark 7a thereof are immediately displayed on the display section 2 of the electronic indicator 1, as well as the frame 7b thereof is lighted intermittently.

In the above case, although the display of the fuel amount information is interrupted, the symbolmark 4a and the frame 4b are lighted continuously by the decode-drive circuits 23 and 24.

Furthermore, in the above case that the decode-drive circuits 23 and 24 are operated as such emergency display control circuits as mentioned above during the occurrence of plural emergencies, it is required in spite of no illustration in FIG. 2 that the emergency signals $G_F$, $G_T$, $G_P$ and $G_V$ are supplied to the decode-drive circuit 23 also similarly as to the decode-drive circuit 24.

Moreover, it is possible also that the intermitting signals $D_P$ is supplied to the decode-drive circuit 23 through either one of the signal lines F', T', P' and V', so as to operate the decode-drive circuit 23 as an intermitting circuit provided for lighting intermittently the symbolmark corresponding to the caused emergency.

In addition thereto, it is possible also that the symbolmarks 4a, 5a, 6a and 7a of the symbolmark display sections FM4, TM5, PM6 and VM7 in the electronic indicator 1 are formed respectively of both of displaying elements which are lighted, for instance, in red and green respectively, so as to be lighted in green in the ordinary state and to be lighted in red in the state emergency selectively.

Nextly, the examples of concrete circuit configurations of the control signal generator 20, the timer circuit 26 and the trigger generators 28 to 32 will be explained by referring to FIG. 3.

Figure 3:
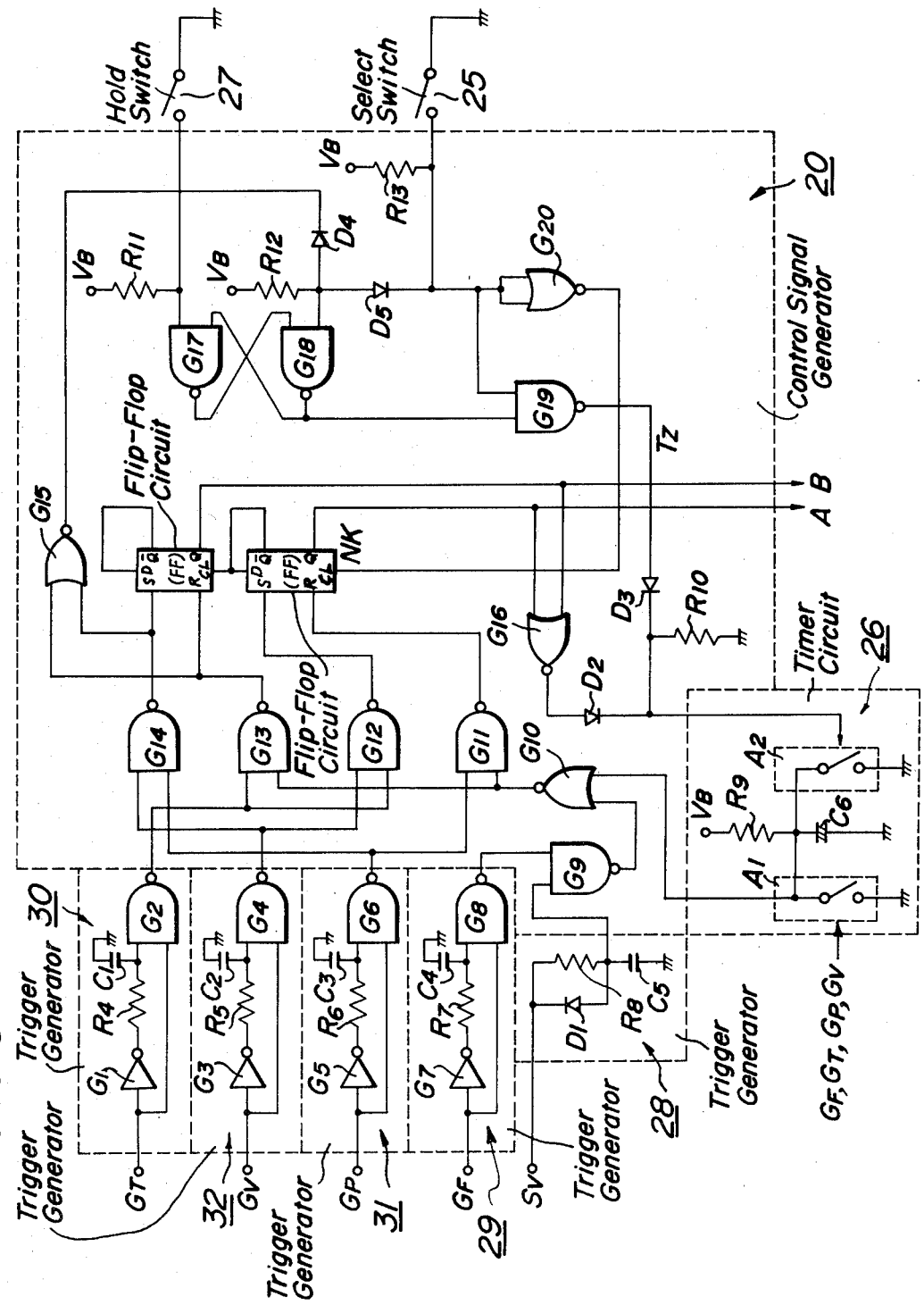
FIG. 3 is a circuit diagram showing a configuration of a control signal generator and surrounding circuits thereof.

In the trigger generator 28, when the voltage signal $S_V$ is imposed thereon by closing the ignition switch not shown in FIG. 3, a capacitor $C_5$ is started to be charged thereby through a resistor $R_8$, so that a low level signal, which corresponds to the trigger signal $T_R$ shown in FIG. 2, is supplied to a NAND circuit $G_9$ in the control signal generator 20, until the terminal voltage of the capacitor $C_5$ reaches a threshold level of the NAND circuit $G_9$.

The respective outputs of the trigger generators 29 to 32 are held at a high level, so long as the emergency signals $G_F$, $G_T$, $G_P$ and $G_V$ are imposed thereon respectively.

As a result thereof, since the output of the NAND circuit $G_9$ is changed to the high level immediately after the ignition switch is closed, only a respective one input of NAND circuits $G_{11}$ and $G_{13}$ among a group of NAND circuits $G_{11}$ to $G_{14}$ are set to the low level by an output of a NOR circuit $G_{10}$, so that the outputs of those NAND circuits $G_{11}$ and $G_{13}$ are set to the high level, so as to reset flip-flop circuits 33 and 34, which are shortened to "FF" hereinafter. As a result, the Q outputs of FF 33 and 34, that is, the aforesaid output signals A and B are set to "0, 0". Only when those output signals A and B are set to "0, 0", an output of a NAND circuit $G_{16}$ is set to the high level, so that a voltage drop is caused on a resistor $R_{10}$, so as to close an electronic switch $A_2$ of the timer circuit 26, and as a result, to ground a capacitor $C_6$ of the timer circuit 26 and to set both inputs of a NOR circuit $G_{10}$ to the low level. At the same time, the FF 33 and 34 are held at the reset state corresponding to the display of the fuel amount information.

When the select switch 25 of self reversion type is closed, an output of a NOR circuit $G_{20}$ is held at the high level for a certain short time duration, and then is supplied to a CL terminal of FF33 as the aforesaid operation signal NK. Those flip-flop circuits FF33 and FF34 are provided with D terminals respectively. Accordingly, in those flip-flop circuits FF33 and FF34, when the high level signal is supplied to the CL terminals thereof at D=0, the Q outputs thereof are set to "0", whilst, when the high level signal is supplied to the CL terminals thereof at D=1, the Q outputs thereof are set to "1", so that, when the operation signal NK is supplied thereto at the state of both of those Q outputs being set to "0, 0", that is, at the state of the Q outputs thereof being set to "1, 1", the output A of FF33 is set to "1", whilst the output B of FF34 is set to "0", those states corresponding to the display of the water temperature information.

On the other hand, when the Q outputs A and B of FF33 and FF34 are set to "1, 0" by closing the select switch 25, the output of the NOR circuit $G_{16}$ is set to the low level, and at the same time the output of the NAND circuit $G_{19}$ is held at the high level for a certain short time duration, so as to maintain the electronic switch $A_2$ as it is closed for the short time duration. As a result thereof, the capacitor $C_6$ in the timer circuit 26 is charged with the time constant of $R_9 \cdot C_6$ by the electronic switch $A_2$ being opened, so that, when the terminal voltage of the charged capacitor $C_6$ reaches to the threshold level of the NOR circuit $G_{10}$, that is, to the high level corresponding to the aforesaid time up signal shown in FIG. 2 about eight seconds thereafter, the output of the NOR circuit $G_{10}$ is set to the low level. As a result thereof, the outputs of the NAND circuits $G_{11}$ and $G_{13}$ are set to the high level, so as to settle FF33 and FF34 into the reset state, namely, so as to set both of the Q outputs A and B into "0, 0" for the self reversion operation.

In the case that it is desired to maintain the Q outputs of FF33 and FF34 in the state of "1, 0", an output of a NAND circuit $G_{18}$ forming a flip-flop circuit together with another NAND circuit $G_{17}$ is set to the low level by closing the hold switch 27, so as to set the output of the NAND circuit $G_{19}$ to the high level. Then, the electronic switch $A_2$ consisting in the timer circuit 26 is closed by the operation signal $T_Z$, namely, the output of the NAND circuit $G_{19}$, so as to inhibit the timer operation thereof, and, as a result, to prevent the reset of FF33 and FF34.

In order to annul the holding operation of the hold switch 27, it is possible that either one of the input terminals of the NAND circuit $G_{18}$ is grounded through a diode $D_5$ by closing the select switch 25, so as to set the output thereof to the high level. In this case, the Q outputs A and B of FF33 and FF34 are reversed also by closing the select switch 25, so that the displayed information is changed. Furthermore, although the explanation will be omitted, every time the select switch 25 is closed, the outputs of FF33 and FF34 are changed in regular order of "0, 1", "1, 1" and so on.

Nextly, for instance, in case that the trigger generator 30 is supplied with the emergency signal $G_T$ as the high level signal derived from the emergency discriminator 16, an output of an inverter $G_1$ is lowered from the high level by the discharge of a capacitor $C_1$ with a time constant of $R_4 \cdot C_1$, and, as a result thereof, the trigger signal $T_T$, which is maintained at the low level for a certain short time duration until the above output becomes lower than a threshold level of a NAND circuit $G_2$, is derived therefrom. Consequently, since the outputs of the NAND circuits $G_{12}$ and $G_{13}$ are set to the high level, FF33 is settled into the state of set, whilst FF34 is settled into the state of reset, so that the Q outputs A and B thereof are set to the state of "1, 0", which corresponds to the display of the emergency relating to the water temperature.

In the above case, the emergency signal $G_T$ is supplied to the electronic switch $A_1$ of the timer circuit 26 from the selection circuit 19 shown in FIG. 2, so that the electronic switch $A_1$ is maintained as it is closed, so as to fix the output of the NAND circuit $G_{10}$ onto the high level. As a result, FF33 and FF34 are saved from the reset, so that the Q outputs A and B of FF33 and FF34 are held at the state of "1, 0".

Similarly as the above, in case that the trigger circuits 29, 31 and 32 are started respectively, the Q outputs A and B of FF33 and FF34 are set to the states of "0, 0", "0, 1" and "1, 1" respectively in response thereto. In this case, an output of a NAND circuit $G_{15}$ is set to the low level in the above respective emergencies, so as to set either one of the inputs of the NAND circuit $G_{18}$ to the low level, so that the output of the NAND circuit $G_{18}$ is set to the high level, no matter whether the hold switch 27 is closed or not.

Nextly, an example of the concrete circuit configuration of the decode-drive circuits 23 and 24 will be explained by referring to FIG. 4.

Figure 4:
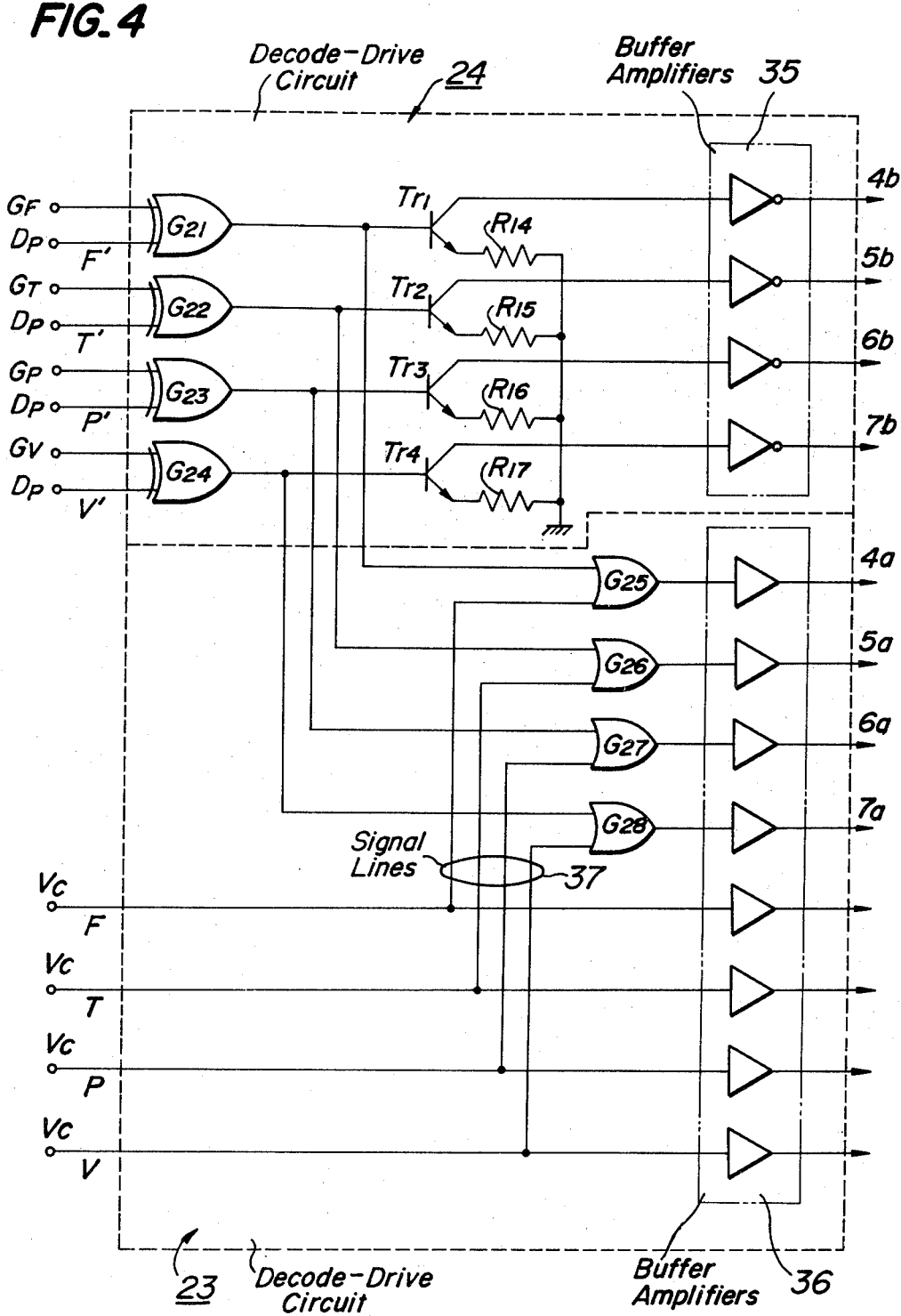
FIG. 4 is a circuit diagram showing a configuration of a decode-drive circuit.

Firstly, in the decode-drive circuit 23, the voltage signal $V_C$, which is distributed to either one of the signal lines F, T, P and V, is supplied to output terminals provided for the symbolmarks 4a, 5a, 6a and 7a of the electronic indicator 1 through either one of the OR circuits $G_{25}$ to $G_{28}$ and a set of buffer amplifiers 36, so as to light either one of those symbolmarks 4a, 5a, 6a and 7a, as well as to light the scale 3b of the electronic indicator 1 through the set of buffer amplifiers 36 and a scale driver not shown in FIG. 4.

On the other hand, in the decode-drive circuit 24, when the intermitting signal $D_P$ is supplied to either one of EX-OR circuits $G_{21}$ to $G_{24}$ through either one of the signal lines F', T', P' and V' respectively, so as to intermit either one of transistors $Tr_1$ to $Tr_4$ respectively by the output thereof, so that either one of the frames 4b, 5b, 6b and 7b of the electronic indicator 1, which are connected thereto through a set of buffer amplifiers 35, is lighted.

Moreover, in the decode-drive circuit 23, in case that a set of signal lines 37, which are branched respectively to the OR circuits $G_{25}$ to $G_{28}$, are detached from the signal lines F, T, P and V respectively, it is possible that, at the occurrence of the emergency, the symbolmarks are lighted intermittently by the intermitting signal $D_P$ in response to the caused emergencies respectively.

Besides, in case that more than two kinds of emergencies are caused at the same time, the intermitting signal $D_P$ is supplied to either one of the EX-OR circuits $G_{21}$ to $G_{24}$ through either one of the signal lines F', T', P' and V' which one corresponds to the lastly caused emergency, whilst, regarding the previously caused emergencies, the emergency signal only is supplied to the EX-OR circuit corresponding thereto, so that the frame which corresponds to the last emergency is lighted intermittently, whilst the other frames which correspond to the previously caused emergencies are lighted continuously.

Figure 5:
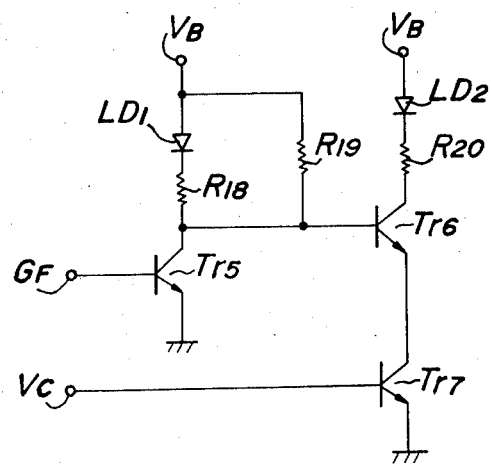
FIG. 5 is a circuit diagram showing a circuit configuration arranged for displaying a symbolmark with a two-tone colour.

Furthermore, in case that it is desired to light the symbolmarks 4a, 5a, 6a and 7a in different colors between in the ordinary state and in the emergency, it is possible to employ such a circuit configuration as shown in FIG. 5.

For instance, in speaking with regard to the symbolmark 4a only, the symbolmark 4a is formed of a luminous diode $LD_1$ which is lighted in red or yellow and another luminous diode $LD_2$ which is lighted in green. In a control circuit for lighting this symbolmarks 4a as shown in FIG. 5, when a transistor $Tr_5$ is conductive in response to the emergency signal $G_F$ applied thereto, the luminous diode $LD_1$ is lighted and a transistor $Tr_6$ is cut off. On the contrary, when the transistor $Tr_5$ is cut off, the transistor $Tr_6$ becomes conductive and further a transistor $Tr_7$ is conductive in response to the voltage signal $V_C$ applied thereto, so that the luminous diode $LD_2$ is lighted. Consequently, it is possible that the color for displaying the symbolmark is changed between the ordinary state and the emergency. Moreover, as a matter of course, the same can be done regarding the remaining symbolmarks 5a, 6a and 7a, and further luminous diodes can be replaced with liquid crystal indicators which can be lighted in various colors.

In the above mentioned example of the circuit configuration of the multifunction electronic meter for a vehicle according to the present invention, although the electronic indicator 1 is formed as of the bar graph type, it is not the only example thereof, and it can be formed also as of the digital display type.

Similarly as the above, although the informations regarding the water temperature, the oil pressure and the battery voltage are displayed selectively as the measured informations other than that of the fuel amount, those are not the only examples thereof, and, for instance, the information of the engine speed and the like can be displayed selectively also.

As it is apparent from the explained above, according to the present invention, the principal information is ordinarily displayed on the electronic indicator, and the remaining informations are selectively displayed on either one display section of the electronic indicator 1 together with the respective symbolmark thereof, so that the most requisite principal information can be ordinarily watched, as well as the remaining informations can be watched also as occasion demands.

Moreover, the multi-functionization of the single electronic meter for vehicle is intended according to the present invention, so that it can be avoided that a number of meters are arranged on the instrument panel of the vehicle, and the simplification of the circumference of the instrument panel can be realized.

In case that, when a predetermined time duration is expired after the above remaining informations are selectively displayed, the display on the single electronic meter is reversed automatically to that of the principal information, the troublesome switching operation therefor can be omitted.

In case that the selective display of the above remaining informations can be held by providing the hold switch, the requisite information can be display for a sufficient time duration required, as well as, in case that the display on the single electronic meter is initially reset to that of the principal information at the start of the engine in response to the operation of the ignition switch, the selective display of the remaining informations which is held by the hold switch can be reversively switched to that of the principal information automatically.

In case that, when any one of emergencies of the poor fuel amount, the too high water temperature, the too low oil pressure and the like is caused, the information relating to the caused emergency is displayed in spite of the kind thereof, the driver can confirm immediately the caused emergency.

Besides, the increase of the warning effect as well as the improvement of the noticeability can be expected by lighting the symbolmarks in different colors between the ordinary state and the emergency.

In case that the symbolmarks are formed of symbolizing figures and surrounding frames thereof respectively, as well as the colors are different between those figures and those frames, the noticeability according to the aesthetic effect as well as the warning effect can be improved extremely.

Moreover, in case that, when more than two emergencies are caused simultaneously, the information relating to the lastly caused emergency is preferentially displayed together with the symbolmark thereof, the frame of which is lighted intermittently, whilst, regarding the previously caused emergencies, only the symbolmarks relating to those emergencies are lighted continuously together with the frames thereof, the simultaneously caused plural emergencies can be confirmed respectively by the driver with the ample noticeability regardless of the employment of the single electronic meter for vehicle.

What is claimed is:

1. A multifunction electronic meter for a vehicle comprising:
   an electronic indicator on a display section of which a plurality of informations derived respectively at least from a fuel amount sensor, a water temperature sensor, an oil pressure sensor and a battery are selectively displayed together with a plurality of symbolmarks provided respectively for identifying and warning said plurality of informations displayed selectively on said display section,
   a display control circuit for controlling said display section such as a principal information consisting of an amount of fuel among said plurality of informations is ordinarily displayed and, when either one of said plurality of informations other than said principal information is selected, said one information is displayed, together with a respective one of said plurality of symbolmarks,
   a plurality of emergency discriminators for discriminating respectively a plurality of emergencies relating respectively at least to the poor fuel amount, the too high water temperature, the too low oil pressure, and the too low battery voltage,
   a switching circuit arranged so that, when either one of said plurality of emergency discriminators discriminates one of said plurality of emergencies, the information relating the discriminated emergency is displayed regardless of the contents of the display on said display section of said electronic indicator,
   a self-reversion circuit arranged so that said principal information is displayed automatically reversionally when a predetermined time duration is expired after one of said plurality of informations other than said principal information is selectively displayed,
   a hold switch for holding either one of said plurality of informations other than said principal information as it is displayed selectively by annulling the operation of said self-reversion circuit, and
   an initially setting circuit arranged so that the information which is held by the operation of said hold switch as it is displayed selectively is switched over reversionally to said principal information when an ignition switch is closed.

2. A multifunction electronic meter for a vehicle as claimed in claim 1, wherein said plurality of symbolmarks are respectively formed of combinations of displaying elements which are lighted in red or yellow and displaying elements which are lighted in green, and said display control circuit further comprises a lighting and intermitting control circuit for lighting continuously or intermittently the frame of the symbolmark corresponding to the emergency discriminated by the emergency discriminator in response to the discrimination thereof.

3. A multifunction electronic meter for a vehicle as claimed in claim 1, wherein said plurality of symbolmarks are respectively formed of combinations of symbolizing figures or letters which are lighted in green and surrounding frames thereof which are lighted in red, and said display control circuit further comprises a lighting and intermitting control circuit for lighting continuously or intermittently the frame of the symbolmark corresponding to the emergency discriminated by the emergency discriminator in response to the discrimination thereof.

4. A multifunction electronic meter for a vehicle as claimed in claim 3, wherein said display control circuit further comprises an emergency display control circuit arranged so that, when more than two emergencies are discriminated by the emergency discriminators simultaneously, the information corresponding to the lastly discriminated emergency is preferentially displayed on said display section of said electronic indicator together with the respective symbolmark the frame of which is lighted intermittently, and, regarding the emergencies discriminated previously, only the respective symbolmarks and the frames thereof are lighted.

* * * * *